United States Patent [19]

Chen et al.

[11] Patent Number: 5,024,680
[45] Date of Patent: Jun. 18, 1991

[54] MULTIPLE METAL COATED SUPERABRASIVE GRIT AND METHODS FOR THEIR MANUFACTURE

[75] Inventors: Sy-Hwa Chen, Salt Lake City, Utah; Chien-Min Sung, Northboro, Mass.

[73] Assignee: Norton Company, Worcester, Mass.

[21] Appl. No.: 261,236

[22] Filed: Nov. 7, 1988

[51] Int. Cl.$^5$ .............................................. B24B 1/00
[52] U.S. Cl. ........................................ 51/295; 51/293; 51/298; 51/309
[58] Field of Search .................. 51/293, 295, 298, 309

[56] References Cited

U.S. PATENT DOCUMENTS

| | | | |
|---|---|---|---|
| 3,650,714 | 3/1972 | Farkas | 51/295 |
| 3,879,901 | 4/1975 | Caveney | 51/295 |
| 3,923,476 | 12/1975 | Roy et al. | 51/295 |
| 3,924,031 | 12/1975 | Nicholas et al. | 51/295 |
| 3,929,432 | 12/1975 | Caveney | 51/295 |
| 3,984,214 | 10/1976 | Praff et al. | 51/298 |
| 4,063,909 | 12/1977 | Mitchell | 51/295 |
| 4,399,167 | 8/1983 | Pipkin | 51/295 |
| 4,776,863 | 10/1988 | Van den Berg et al. | 51/295 |

Primary Examiner—William R. Dixon, Jr.
Assistant Examiner—Willie J. Thompson

[57] ABSTRACT

Multiple metal coated diamond grit for improved retention in a tool matrix comprises a first layer coating of a metal carbide of a strong carbide former, preferably chromium, titanium or zirconium, chemically bonded to the diamond and a second metal coating of an oxidation resistant carbide former, preferably tungsten or tantalum, chemically bonded to the first metal layer. A third metal layer coating of an alloying metal, preferably nickel, can also be added. In accordance with the method of the present invention, the first layer metal can be applied by metal vapor deposition. The second layer metal can be applied by chemical vapor deposition. The third layer of an alloying metal can be applied by electroless or electrolytic plating.

32 Claims, 4 Drawing Sheets

MULTIPLE METAL COATED SUPERABRASIVE GRIT AND METHODS FOR THEIR MANUFACTURE

FIELD OF THE INVENTION

The present invention relates to superabrasive grit with multiple metal coatings for improved retention in abrasive or cutting tools, and methods for their manufacture.

BACKGROUND OF THE INVENTION

Superabrasive grit comprised of diamond and cubic boron nitride ("CBN") are widely used in sawing, drilling, dressing, and grinding applications. The grit is typically held in a matrix of nickel, copper, iron, cobalt, or tin, or alloys thereof, by mechanical bonds and the matrix is connected to a tool body. The matrix can also comprise a resin, such as phenol formaldehyde.

In mechanical bonding, the matrix surrounds the grit, holding them in place. While simple and practical, mechanical bonds are relatively weak and the grit can be easily lost as the surrounding matrix is abraded away during use. Grit retention can be improved by limiting the exposure of the grit by the matrix, but this decreases cutting efficiency. In a typical saw blade application, the average exposure of diamond grit is less than 20% of the total grit height. Grit loss can become a serious problem when the supporting matrix is worn down such that over one-third of the grit is exposed. The average lifetime of such cutting tools is decreased as up to two-thirds of the original diamond grit are prematurely lost.

In an attempt to improve grit retention, diamond particles have been coated with carbide forming transition metals. For example, U.S. Pat. No. 3,650,714, to Farkas, discloses a method of coating diamond particles with a thin titanium or zirconium layer, typically up to 5% by volume of the diamond, by metal vapor phase deposition. The coating's inner surface forms a carbide with the diamond. A second layer of a less oxidizable metal, such as nickel or copper, can then be applied to protect the inner layer from oxidation. Diamond particles coated by titanium are commercially available from DeBeers and General Electric.

Tensile testing of double layer coated diamond having an inner layer such as titanium or chromium and an outer layer such as nickel shows that fracturing occurs at the interface between the inner and outer metal layers. This suggests that nickel does not alloy or otherwise bond well with the underlying carbide and that double layer coated grits according to Farkas may not significantly improve overall grit retention. Bonding can also be weakened by oxidation of the inner titanium or chromium layers during the nickel coating process.

In U.S. Pat. No. 4,339,167, Pipkin discloses metal coating diamond or CBN particles with titanium, manganese, chromium, vanadium, tungsten, molybdenum or niobium by metal vapor deposition. It has been found, however, that the carbide formers chosen by Pipkin, do not bond strongly enough to the diamond crystals to improve their grit retention for many high stress applications, or are susceptible to oxidation. As discussed above, the outer metal layers used to protect inner layers from oxidation, do not adequately bond to the inner layer.

U.S. Pat. No. 4,378,975, to Tomlinson, describes a first, thin metal coating up to 10% by volume of the particle and a second, wear resistant coating of between one and two times the radius of the particle. The inner coating is preferably chromium and the outer coating is a nickel-iron based alloy, a metal bonded carbide or boride, or silicon carbide. A metal bonded carbide is typically a mixture of a metal or alloy and a carbide. Although not elaborated upon, a metal bonded carbide can be bonded to the first metal layer by metallurgical bonds between the metal of the metal bonded carbide and the first layer. There is essentially no direct chemical bonding between the carbide itself and the first layer.

In U.S. Pat. No. 3,929,432, Caveney controls the duration of heat treatment to improve the bond between an inner titanium layer and diamond in a double coated diamond particle having an outer layer of nickel, or other alloying metals. The patent does not address the problem of weak bonding between the titanium and the outer alloying metal coating.

Metal coatings have also been used in resin matrices to insulate the superabrasive particle, decreasing thermal degradation, and to improve the bonding of grit to the matrix. Nickel coated grit has improved retention in resin matrices over uncoated grit due to improved adhesion with the matrix. The bond between the grit and the nickel, however, is still weak and is a cause of grit loss.

SUMMARY OF THE INVENTION

It has been found that applying a metal coating of an oxidation resistant carbide former over a first metal coating of a strong carbide former results in stronger bonds between the metal layers, resulting in improved grit retention in a matrix.

Accordingly, the coated superabrasive grit of the present invention comprise diamond particles with a first metal carbide coating layer chemically bonded to the diamond. The metal is a strong carbide former, preferably chromium, or less preferably titanium or zirconium. A second metal layer of a metal carbide is chemically bonded to the first metal carbide layer, and comprises an oxidation resistant carbide former, preferably tungsten or tantalum. The preferred thickness range for the first metal layer is between 0.05–5 microns. The preferred thickness range for the second metal layer is between 5–15 microns.

Optionally, a third metal coating of a metal which bonds with the second layer and with the matrix can be added for further improved bonding with the matrix. Nickel, cobalt, iron or alloys of these metals can be used, with a thickness between 1–100 microns.

The method for manufacturing metal coated grits in accordance with the present invention comprises applying a first metal coating by, for example, metal vapor deposition; applying a second metal coating by, for example, chemical vapor deposition; and optionally applying the third coating by electroless or electrolytic plating.

A superabrasive tool matrix and a superabrasive tool are also disclosed comprising the multilayer metal coated diamond or CBN grit chemically bonded to a matrix of a metal, such as nickel, copper, cobalt, or alloys thereof, or a resin.

In an additional embodiment, the superabrasive grit can comprise cubic boron nitride ("CBN") with a first metal nitride and/or boride layer, chemically bonded to the CBN. The metal is preferably titanium or zirconium. A second metal coating layer of an oxidation resistant nitride and/or boride former, preferably tantalum, is chemically bonded to the first layer. A third metal layer of nickel, cobalt, iron, or alloys thereof, can also be applied.

DESCRIPTION OF THE INVENTION

In accordance with the process of the present invention, uniformly sized diamond grit, typically between 0.5–3,000 microns, are coated with a first metal coating layer comprising a strong carbide former. The diamond grit can be, for instance, synthetic diamond crystals, such as SDA 100+ from DeBeers or MBS 760 from General Electric, or they can be natural diamond crystals, such as EMBS from DeBeers. To prepare the diamond grit for coating, they are preferably first washed in nitric or hydrochloric acid or heated under a hydrogen atmosphere to remove surface contaminants. Similarly, in accordance with the present invention, cubic boron nitride ("CBN") can be coated with a first metal coating layer comprising a strong nitride and/or boride former.

The first metal coating is preferably applied by metal vapor deposition ("MVD"), in a manner known in the art. Typically, a mixture of a powder of the metal to be applied and the diamond grit are heated in a crucible in a vacuum furnace chamber to a sufficient temperature for the metal to vaporize. The metal vapor deposits on the diamond grit surface, forming a metal carbide with the diamond. The grit are shaken and screened to separate rate them from each other and the remaining metal. The deposition preferably conducted in a vacuum of better than $10^{-6}$ torr. A non-oxidizing atmosphere of argon or hydrogen, for example, can also be used. Chemical vapor deposition or physical vapor deposition can be used to apply the first layer but these methods are more expensive and not necessary in this step of the process.

For coating diamond grit, chromium, titanium or zirconium are the preferred carbide formers due to the strength of their bond to diamond and the ease with which they can be applied. These metals chemically react with the carbon of the diamond particle to form a carbide layer, in the case of chromium, chromium carbide ($Cr_3C_2$), bonded to the diamond. During deposition, essentially the entire metal layer carbides. Chromium is the most preferred first layer metal since it bonds most strongly with diamond. While not fully understood, it is believed that the bond is an atom to atom bond between the carbon of the diamond and the carbide layer. For coating CBN grit, titanium or zirconium are the preferred nitride/boride formers due to the strength of their bond to CBN.

The preferred range of thickness for the first layer coating is between 0.05 to 1 micron, while a thickness of up to 5 microns is acceptable. 0.05 to 0.30 microns is most preferred. If the metal/carbide layer is too thin, subsequent metal coatings could diffuse to the surface of the diamond, displacing the chromium and forming weaker bonds with the diamond than would the first layer metal. In addition, if the first metal carbide layer is too thin, there may not be enough carbide for bonding to the second layer metal. 0.05 microns has been found to be about the minimum coating thickness which ensures a continuous chromium carbide coating which is not susceptible to diffusion and is adequate for bonding. To create coatings thicker than 5 microns, higher temperatures and longer processing times would be required during metal vapor deposition, which could cause unnecessary degradation and carbidization, which is discussed further, below.

In diamond grit of 500 microns nominal diameter, between four to six hours of MVD of chromium at 720° C. and $10^{-7}$ torr has yielded chromium coatings of at least 0.05 microns, which are the preferred application conditions, as is discussed below. 2 hours of MVD at 770° C. has yielded coatings between 0.10–0.40 microns. 2 hours at 820° C. and 870° C. have yielded coatings of between 0.30–0.50 microns and 0.50–0.80 microns, respectively. One hour of MVD at 920° C. has been sufficient to yield a coating thicknesses of about 1 micron.

The temperature of the process was determined by a thermocouple composed of a platinum and a platinum/rhodium alloy, 13% by weight rhodium. To calibrate the thermocouple, the melting point of aluminum was determined. The thermocouple read 30° C. above 660° C., the known melting point of aluminum. Therefore, 30° C. was subtracted from the temperatures yielded by the thermocouple, to give the actual temperatures listed herein.

It is believed that before deposition actually takes place, the vacuum furnace chamber outgasses, during which time the vacuum pump draws out moisture or other residues which interfere with the coating process. At higher temperatures, therefore, the diamond is being subjected to degradation while no deposition takes place. It has been found that outgassing can be performed at 670° C. for 1 hour. Use of such an outgassing step allows for decreased exposure to high temperatures, and is therefore preferred in the process of the present invention when temperatures above 720° C. are used. When the process includes outgassing, the following representative temperatures and durations have yielded coating thicknesses between 0.05–0.10 microns on diamond grit of 500 micron nominal diameter: 720° C.–6 hours; 770° C.–1 hour; 820° C.–30 minutes; and 870° C.–15 minutes. With this method, deposition can be conducted at high temperatures for shorter periods of time, possibly decreasing the degradation of the diamond.

It is believed that these coating temperatures and durations are applicable to diamond grit having nominal diameters between 300–3,000 microns. Smaller grit may require longer coating durations and/or higher temperatures. For example, it took 16 hours at 745° C. to coat diamond grit of 200 microns nominal diameter to a thickness between of 0.05–0.10 microns. By similarly increasing the temperature and duration of the coating process, grit with nominal diameters at least as small as 40 microns can be prepared. It has also been found that if the level of iron contamination of the chromium feedstock is greater than about 0.02% by weight, the MVD temperature and duration required to apply specific thicknesses of chromium may need to be increased. It is believed that the presence of other contaminants could effect the temperature and duration of the coating process as well. If a non-oxidizing atmosphere such as argon or hydrogen is used instead of a vacuum, higher temperatures may also be required.

The temperature of the coating process can cause degradation of the diamond crystal, which can be detrimental to the performance of a cutting tool. Such degradation can be caused by thermal stress from the differential thermal expansion rates between synthetic diamond crystals and the metal catalysts which can be present within its structure. Excess carbidization due to high temperatures and heating durations can also weaken the crystal. Such deterioration can result in excessive fracture of the grit during actual use, increasing the wear and decreasing the speed of cut of the cutting tool. Degradation and excess carbidization, therefore, should be minimized.

The tensile and friability tests discussed below demonstrate that there is essentially no diamond degradation when the chromium is applied at about 720° C. While this temperature did not yield the maximum bond strength between the chromium and the diamond, the bond strength was sufficient for improved grit retention and performance. 720° C. is, therefore, the preferred application temperature.

Tensile strength testing of grit coated with chromium at various temperatures was conducted. The grit were also coated with about 10 microns of tungsten, in a manner described below. A single layer of the diamond grit prepared in accordance with the present invention were placed between two halves of a tensile sample mold filled with a mixture of bronze and tungsten carbide powders. The halves were joined and hot pressed such that the coated grit bonded the mold halves together. An increasing tension was applied to both ends of the resulting tensile sample, until it broke across the grit layer. When MVD was performed as described above without a separate outgassing step, tensile strength increased with an increase in the temperature of deposition up to about 770° C. At higher temperatures, the tensile strength decreased, possibly due to degradation of the diamond. Tensile strength testing of the grit coated with chromium for between 4-6 hours at 720° C. with 1 hour of outgassing showed bond strengths between 15-19 ksi. (1 ksi equals 1,000 pounds per square inch). It is believed that the other coating conditions, which yielded approximately the same thickness, would yield comparable bond strengths.

Friability tests were also conducted on grit coated at various temperatures, with and without the separate outgassing step. Samples of newly received diamond crystals of SDA 100+ grade, 30/40 mesh, from DeBeers, were coated with chromium for 6 hours at 720° C. and for 2 hours at 770° C. and at 820° C. The samples of chromium coated grit were then coated with 10 microns of tungsten, in a manner described below. The coated grit were then "stripped", by first soaking in a solution of equal parts of hydrofluoric acid and nitric acid to dissolve the tungsten/tungsten carbide layer. They were then soaked in a solution of sulfuric acid and a few pellets of potassium iodate to dissolve the chromium carbide layer. The stripped grits were placed in a Friatester, available from General Electric, which vibrates the grits, breaking the deteriorated diamond crystals. After screening with a 50 mesh to separate the broken pieces, the percentage of the diamond grit remaining yields the "Friability Index". For the samples coated at 720° C., the index was 67.9; for those coated at 770° C., 62.4; and for those coated at 820° C., 61.1.

Uncoated grit were also tested, slowing an index of approximately 68.6. According to it's specification, the Friability Index of the SDA 100+ grade diamond is 66±3. Both the untreated grit and the grit coated at 720° C. fell within this range, showing that the heat treatment caused little or no degradation.

A limited number of Friability tests were also conducted on grit coated by the preferred method when utilizing high temperatures, which included outgassing at 670° C. for 1 hour. Grit coated with chromium at 850° C. for 30 minutes yielded a Friability Index of 63.8 and grit coated for 15 minutes at 900° C. had an index of 64.0. While the range of values was wide and too few tests were conducted to have a high level of statistical confidence in the results, these tests do suggest that there is less degradation when the exposure to high temperatures is decreased.

As stated above, 720° C. is the preferred application temperature, despite the slightly lower tensile strength. If higher temperatures are used, the outgassing step is preferred. If the grit were natural diamonds, or higher grades of synthetic diamond were used, such as SDA 100s from DeBeers or MSD from General Electric, there would be less internal thermal stress and higher temperatures, such as 770° C., could be better tolerated. While 720° C. would still be the preferred application temperature, higher temperatures could be used for improved bond strength.

The preferred first layer carbide formers and their carbides are susceptible to oxidation, therefore, an oxidation resistant coating which bonds well with the first metal coating is applied. In accordance with the present invention and in contrast to the prior art, the second coating comprises an oxidation resistant carbide former which chemically bonds directly to the first metal carbide layer. If used in a metal matrix, the second layer metal should also bond well with the matrix material of the tool, which typically includes bronze, nickel, cobalt, copper, tin, or alloys thereof. Tungsten and tantalum are the preferred metals meeting the above criteria since they form the strongest bonds with carbon among the oxidation resistant metals. Both bond well with the chromium carbide of the first coating layer. It is believed that the tungsten or tantalum displaces the chromium in the chromium carbide, forming tungsten carbide or tantalum carbide. It is further believed that the first layer remains essentially chromium carbide after its reaction with the second layer metal, probably by additional carbiding with the diamond crystal. Molybdenum can also be used, but is less preferred because it is easily hydrated, weakening it's bond to the inner layer.

Similarly with CBN, titanium and zirconium are susceptible to oxidation. An oxidation resistant boride and/or nitride former is therefore applied and bonded to the first layer. Tantalum is preferred.

Chemical vapor deposition or physical vapor deposition can be used to apply the second layer. Metal vapor deposition is not preferred in applying tungsten or tantalum because the high temperatures required in the process would degrade the diamond.

The most preferred method of applying the second layer metal is chemical vapor deposition ("CVD"), which involves the dissociation of a metal compound (such as tungsten hexafluoride) to form a metal vapor, and the subsequent deposition of the metal on the grit. See, for example, U.S. Pat. No. 3,757,878, to Wilder. CVD is preferred because of the ease with which a large number of grit can be evenly coated and the relatively low temperature that can be used to deposit tungsten or tantalum. In the process of the invention, CVD is typically performed at 700° C., and 7 torr, in a reducing atmosphere for between 15-90 minutes. See Example 1.

Preferably, the second layer metal does not completely carbide, due to the small amount of chromium carbide in the thin first layer. Strong bonds can then be formed between the tungsten or tantalum remaining in the outer portion of the second layer and the matrix by diffusion and the formation of a solid solution with the matrix material. There can also be intermetallic bonding with the matrix, depending on the matrix and the second layer metal. If the outer portion of the second layer partially or completely carbides, there will still be adequate bonding to the matrix because these carbides are easily wet by the typical components of the matrix, such as nickel.

The second metal layer is preferably between 5-30 microns thick, with coatings up to 15 microns being more preferred. Thinner coatings may be adequate depending in part on the methods and conditions of application. For example, CVD typically yields a somewhat columnar tungsten coating which is permeable to liquid alloy. The coatings must therefore be thick enough to adequately protect the inner metal layer from oxidation and prevent diffusion of subsequent metal coatings or metals in the matrix which can contact and poorly bond with the inner metal layer. Therefore, at least 5 microns is preferred. Thinner coatings, such as 3 microns, or even 1 micron, could, however, be sufficient in some less critical applications. If physical vapor deposition is used to apply the tungsten, the tungsten layer is typically less porous. Thinner coatings than those above could, therefore, be adequate to prevent diffusion and oxidation. An improved CVD process may also yield less porous coatings. Coatings thicker than 15 microns do not show much advantage over thinner coatings and coatings thicker than 30 microns could unnecessarily increase production costs.

CVD processing will probably not cause adequate carbiding in the second layer due to the relatively low temperature of the process. Heat treatment is therefore a preferred additional step in the process of the present invention to increase carbidization of the second layer and increase the bond strength between the first and second metal layers. Between about 1 minute to 1 hour of heat treatment in a reducing atmosphere of a graphite container, or in a vacuum, at temperatures between 720° C. up to the temperature of chromium deposition, is sufficient. A temperature less than the temperature of deposition is preferred to minimize further degradation. This additional heat treatment also appears to increase the strength of the first layer's bond to the diamond, possibly by assisting in the carbidization of the chromium displaced by the second layer metal.

Optionally, for improved bonding with a matrix, a third metal coating layer can be applied by electrolytic or electroless plating in a manner known in the art. For use in a metal matrix, any oxidation resistant metal compatible with the matrix and the second metal layer may be used. Nickel, cobalt, and iron, or alloys of these metals, are preferred. Nickel is most preferred because it bonds well with the preferred second layer metals and also bonds well with the typical matrix materials. Cobalt and iron both wet tungsten and tantalum and improve their bonding to the matrix. If a resin matrix is used, as described below, the use of a third coating layer is preferred for thermal insulation and improved adhesion. Nickel is also preferred as a third layer coating with resin matrices.

Grit coated for use in metal matrices, can have a third layer coating between about 0.5-100 microns. Coatings less than 20 microns are preferred, however. If too thin, the coating might not provide the desired bonding improvement. If the coating is too thick, the composition of the matrix can be altered, affecting its properties. In a resin matrix, the third layer coating is preferably about one-third of the diameter of the coated grit for adequate insulation and surface contact for improved adhesion.

Also in accordance with the present invention, a superabrasive cutting tool element comprises a matrix and multilayer metal coated grit chemically bonded to the matrix. The multilayer metal coated grit are described above. The matrix can be a metal, a metal alloy or a resin. A metal or metal alloy matrix cutting element can be used as a sawblade segment or in a drill bit, for example. The metal alloy typically comprises an alloy of nickel, cobalt, copper or tin.

A resin matrix can be used in a superabrasive wheel, for example, for grinding hard materials such as tungsten carbide. The preferred resin is phenol formaldehyde, due to its low cost and thermal stability. Thermoplastic polyimide, manufactured by DuPont Corporation, can also be used, as well as epoxies and polyurethanes. The matrix also includes a filler, such as silicon carbide, copper or graphite. The filler is used to modify the physical characteristics of the matrix, such as its strength, wear resistance and thermal conductivity. The nominal diameter of the filler is usually less than the nominal diameter of the coated superabrasive particles. Such a cutting tool element typically comprises between 15-20% by volume of coated diamond or CBN grit, 20-40% by volume of filler and the remainder resin. The coating insulates the grit from the high temperatures generated during the grinding process, decreasing their thermal degradation. It also improves the adhesion of the particle to the resin.

To prepare a superabrasive cutting tool element in accordance with the method of the present invention, the desired amount of grit coated in accordance with the present invention is mixed with a powder of the matrix. In a metal matrix, the powder can comprise, for example, a mixture of 70% bronze (85% copper/15% tin) and 30% cobalt. The mixture is hot pressed in a graphite container at 790° C. and 5,000 psi for 3 minutes. A superabrasive cutting tool in accordance with the present invention comprises a superabrasive cutting element, as described above, attached to a support.

In a resin matrix of phenol formaldehyde, the resin is ground to a fine powder and mixed with the filler and coated superabrasive particles. The mixture is placed in a hardened steel mold an placed between the platens of a hydraulic press at a temperature of about 160° C. The mold is closed under a pressure of 2-5 tons per square inch for about 30 minutes. If thermoplastic polyimide is used, the temperature of the press should be between 400°-450° C.

Tensile strength testing of double or triple coated superabrasive grit made in accordance with the present invention demonstrated that the bond between the metal coating and the diamond, between the coatings themselves, and between the grit and the matrix, were stronger than those bonds in comparable prior art grit. Uncoated diamonds had zero bonding strength when subjected to the tensile strength testing in the Examples below. Diamonds coated directly with tungsten fractured at the interface between the diamond and the tungsten, at about 10–13 ksi. Diamonds coated with chromium and nickel had slightly higher tensile strength, but were pulled out of the matrix without breaking the diamond, showing that such coated grit have low grit retention. Such grit generally were separated between the chromium and nickel layers. Grit coated in accordance with the present invention, with an inner chromium layer and an outer tungsten layer, fractured under a stress of between 15–25 ksi, across most of the diamond crystals, depending on the temperature of chromium deposition. Use of a third nickel coating resulted in even higher tensile strength. The extent of diamond fracture indicates that the bonds between the metal and the diamond, the metals to each other, and the coated grit to the matrix, are at least as strong as the diamond itself.

EXAMPLE 1

10 grams of SDA 100+, 30/40 mesh diamond grit from DeBeers were cleaned by dipping in an acid solution of hydrofluoric and nitric acid for about 1 minute. They were then rinsed in deionized water for 15 minutes, washed in dilute NaOH solution for 2 minutes and again rinsed in deionized water. After drying, the grit was mixed with 10 grams of chromium powder with a nominal diameter of 5 microns and placed in a porcelain crucible. The crucible was loosely covered by a lid and placed in a vacuum furnace chamber. A vacuum of $10^{-6}$ torr was applied, and the furnace was heated up to 820° C. at a rate of 30° C. per minute. The furnace temperature was maintained at 820° C. for 2 hours. Chromium layers between 0.3–0.5 microns thick were deposited.

The chromium coated diamond grit were loaded in a chemical vapor deposition reactor comprising a vertical graphite tube. The reactor was evacuated below 0.5 torr to allow off gassing of any moisture which was still present. Then helium gas was introduced into the chamber at a pressure of 12 torr and a flow rate of 0.1 liter per minute. During this part of the process, the reactor was heated to 700° C. in 16 minutes. The flow rate of the gas was increased to 0.22 liter per minute to fluidize the diamond grit in the reactor and tungsten hexafluoride ($WF_6$) and hydrogen gas were introduced at rates of 50 cc per minute, and 300 cc per minute, respectively. Tungsten was deposited on the chromium coated diamond grit, reaching about 11 microns in about 75 minutes. A flow of argon was then introduced, to assist in purging the reactor.

The coated grit were tensile tested by close packing 0.066 grams of the grit in a single layer on a cross-section of a graphite sleeve having an inner diameter of ⅜ inch, an outer diameter of 0.5 inches and a height of 0.5 inches. The grit were sandwiched between two cold pressed alloy pellets. The alloy comprised 80% by weight of bronze (85/15% copper/tin) and 20% by weight of tungsten carbide. The sleeve was placed in one half of a graphite mold of 0.5 inches inner diameter, filled with a powder of the alloy used to for the pellets. The second half of the mold was also filled with the same powder. The halves were joined and the sample was hot pressed at 815° C. and 3,500 psi for 3 minutes. After being removed from the mold and allowed to cool, the tensile sample was mounted in the Vee grips of a tensile testing machine available from, for example, Instron Corporation. A gradually increasing tension was applied to the ends of the sample until it was pulled apart across the cross-section. The tension fracturing the sample was the tested tensile strength.

In the tests run, the bond strength between the coated grit and the matrix of bronze and tungsten carbide was shown to be between 20.3–21.3 ksi, with most of the fracturing occurring across the diamonds themselves.

The remainder of the coated grit were subjected to a friability test to determine the extent of degradation caused by the coating process. The grit were first soaked in a solution of equal parts of hydrofluoric and nitric acids to dissolve the tungsten/tungsten carbide layer. They were then soaked in a solution of sulfuric acid and a few pellets of potassium iodate to remove the chromium carbide. The "stripped" grit were placed in a Friability tester, available from General Electric, and vibrated. After screening with a 50 mesh, 61.1% of the grit remained. This compared to 68.6% for the grit which were not processed.

Diamond grit were prepared as in Example 1, with MVD conducted at the following conditions:

EXAMPLE 2

MVD of chromium—6 hours at 720° C., yielding coatings of at least 0.05 microns.

EXAMPLE 3

MVD of chromium—2 hours at 770° C., yielding coatings between 0.10–0.40 microns.

EXAMPLE 4

MVD of chromium—2 hours at 870° C., yielding a coating of about 0.75 microns.

EXAMPLE 5

MVD of chromium—1 hour at 920° C., yielding a coating of about 1 micron.

Grit prepared as in Examples 2–5 were subjected to tensile testing as in Example 1. The test results, listed in the following chart, show that tensile strength increased with temperature, up to 770° C. At higher temperatures, the tensile strength decreased. As discussed above, it is believed that this is due to increased diamond degradation caused by the higher temperatures. The grit prepared as in Examples 2–3 were also subjected to friability tests as described in Example 1.

The grit coated at 720° C. showed essentially no degradation, with a Friability Index of 67.9. This is comparable to the index of uncoated grit tested in Example 13. At 770° C., the index fell to 62.4, indicating the existence of some degradation. These results are summarized in the chart below.

EXAMPLE 6

10 grams of SDA 100+, 30/40 mesh diamond grit were cleaned as in Example 1 and were mixed with 10 grams of chromium powder having a nominal diameter of 5 microns. The mixture was placed in a porcelain crucible loosely covered by a lid, and inserted into a vacuum furnace chamber. A vacuum of $10^{-6}$ torr was applied, and the chamber was heated to 670° C. in 30° C. per minute intervals. The furnace was maintained at 670° C. for 1 hour, to allow the outgassing of any moisture or other impurities in the chamber. The furnace was then heated up to a temperature of 720° C., which was maintained for 6 hours. The coated grit showed a weight gain of about 0.41%, which is equivalent to an average coating thickness of about 0.05 microns.

Chemical vapor deposition was conducted as in Example 1, yielding a tungsten coating of approximately 10 microns.

In the following Examples, metal vapor deposition was conducted as in Example 6, at the following conditions after outgassing, applying a chromium coating between 0.05–0.10 microns:

EXAMPLE 7

MVD of chromium, 1 hour at 770° C.

EXAMPLE 8

MVD of chromium, 30 minutes at 820° C.

EXAMPLE 9

MVD of chromium, 15 minutes at 870° C.

EXAMPLE 10

Same as Example 6, except for the use of SDS 100s grade diamond grit.

EXAMPLE 11

Same as Example 6, except for use of MSD grade diamond grit, from General Electric.

Tensile testing of the grit prepared as in Example 6 showed bond strength between 15–19 ksi. Grits were prepared in accordance with Examples 7–11 but were not tested. Based on the thickness of the chromium and tungsten layers, it is believed that the tensile strength would be comparable to that of Example 6. Friability testing of the grit of Example 10 yielded an index of 71.4. According to it's specification, the Friability index of unprocessed SDS 100s is 71±2, showing that there was essentially no degradation. Example 11 was not tested for degradation but comparable results would be expected.

EXAMPLE 12

Coated grits were prepared as in Example 3, with an additional metal coating of 2 microns of nickel-boron (1% boron) flash coated by electroless plating. The tungsten coated grit were dipped in Niklad 752, a nickel-boron solution available from the Allied-Kelite Division of Witco Corp., at a ph of 6 and a temperature of 80° C. The ph can be controlled by adding sodium hydroxide (NaOH) or an acid, such as hydrochloric acid (HCl). Flash coating refers to a rapid application of a thin metal layer.

The coated grit was bonded to a matrix by mixing the coated grit, 7.5% by volume, with a powder of the matrix material, comprising 70% cobalt and 30% bronze (85/15% copper/tin) in a mold. The mold was hot pressed at 800° C. and 3,500 psi for 3 minutes. This sample was not tensile tested, however, it is believed that the tensile strength would fall between 21.5–26.5 ksi, showing a slight improvement over Example 3, due to the nickel layer.

EXAMPLE 13

As a control example, uncoated diamond grit were tensile tested as in Example 1. The end product showed 0 ksi tensile strength and the diamond crystals were all pulled out of the matrix. The uncoated grit was also subjected to friability tests, yielding an index of 68.6, which is within the specification range of 66±3% this diamond grit.

EXAMPLE 14

As a further control example, diamond grit of the same size as Example 1 were coated by a 19 micron tungsten layer by the CVD process discussed in Example 1. The single coated diamond grit had tensile strengths between the 10–13 ksi when subjected to the test described in Example 1. Fracturing occurred at the interface between the tungsten and the diamond.

| Tensile Strength Testing Results | | | |
|---|---|---|---|
| Example | MVD Conditions | Tensile Strength | Friability Index |
| 1 | 820° C., 2 hours | 20.3–21.3 ksi | 61.1 |
| 2 | 720° C., 6 hours | 17–19 ksi | 67.9 |
| 3 | 770° C., 2 hours | 19.5–24.5 ksi | 62.4 |
| 4 | 870° C., 2 hours | 17–19 ksi | |
| 5 | 920° C., 1 hour | 16–17 ksi | |
| 6 | Outgas 720° C., 6 hours | 15–19 ksi | |
| 7 | Outgas 770° C., 1 hour | | |
| 8 | Outgas 820° C., 30 mins. | | |
| 9 | Outgas 870° C., 15 mins. | | |
| 10 SDS 100s | Outgas 720° C., 6 hours | 19–20 ksi | 71.4 |
| 11 MSD | Outgas 720° C., 6 hours | 19–20 ksi | |
| 12 | 770° C., 2 hours | 21.5–26.5 | |
| 13 | Uncoated | 0 | 68.6 |
| 14 | Tungsten Coated | 10–13 | |

The tensile strengths of the grit prepared in Examples 1 and 3 were high, but the Friability Index showed significant degradation. This indicates that in an actual application, the performance of a cutting tool made in accordance with the present invention could be somewhat decreased. This is discussed further, below. Example 2, which showed essentially no degradation when compared to uncoated grit, is the preferred process.

Wear tests were performed on triple-coated grit prepared as in Example 12, under the following conditions:

EXAMPLE 16

MVD of chromium—2 hours at 820° C., yielding a 0.3–0.5 micron layer;

CVD of tungsten—1 hour at 700° C., yielding an 8.5 microns layer;

Heat treatment—1 hour at 850° C.; and

Electroless deposition of nickel boron, yielding a 5 micron nickel coating.

EXAMPLE 17

MVD of chromium—2 hours at 770° C., yielding a 0.10–0.40 micron layer;

CVD of tungsten—1 hour at 700° C., yielding about a 6 microns layer;

Heat treatment—1 hour at 770° C.; and

Electroless deposition of nickel boron yielding a 1.5 micron nickel coating.

Wear tests were conducted by sawing cured concrete a fixed depth and determining the wear of the saw blade. One cubic yard of the concrete was prepared by mixing 498 pounds of cement, 1,110 pounds of sand, 1,875 pounds of granite aggregate, with 24 gallons of water and 3 ounces of Pozzolith 300N hardening accelerator. The mixture was poured into individual molds. The triple coated grit prepared in Examples 16 and 17 were bonded to a saw blade segment, 1.9 inches long and 0.165 inch wide, by mixing the coated grit with a powder of 70% bronze (85% copper/15% tin) and 30% cobalt, and hot pressing at 790° C. and 5,000 psi for 3 minutes in a graphite container. The diamond concentration of each segment was 7.5 volume percent, or 30 concentration. Uncoated diamond grit saw segments were similarly prepared. The saw segments were bonded to a 14 inch diameter blade and the prepared concrete was wet cut 3 inches at 2680 RPM and 12 kilowatts power.

Figure 1:
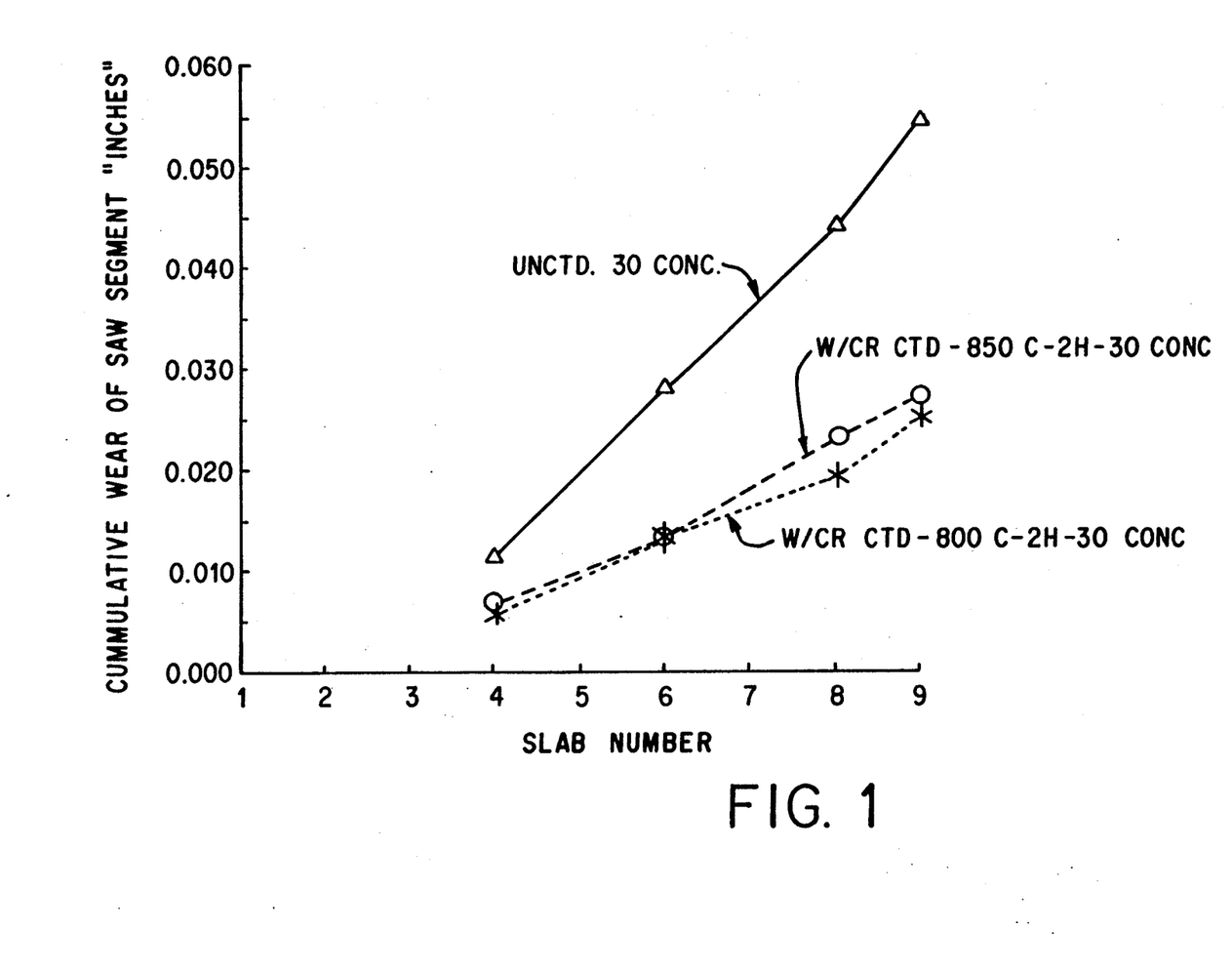
FIG. 1 compares the results of wear tests of multi-layer metal coated grits coated in accordance with the present invention and uncoated grits, in different samples of concrete.

The results of the saw segment wear tests on individual concrete slabs are shown in FIG. 1. The use of grit coated in accordance with the present invention showed significantly lower wear than uncoated grit, when cutting the same depth of concrete. The wear of saw segments with grit coated as in Example 16 is indicated by the dashed lines, the wear of the saw segments with grit coated as in Example 17 is indicated by the dotted lines and the results for the uncoated grit is indicated by the solid line. In slab 4, both saw segments comprising coated grit showed wear of approximately 0.006–0.007 inches, while saw segments with uncoated grit showed wear of 0.010 inches. In slab 9, the coated grit showed wear of about 0.025 inches while the uncoated grit saw segments showed wear of 0.055 inches. The variation between slabs is due to the randomly varying degree of hardness in the concrete.

The grit coated at 770° C. showed slightly better resistance to wear than the grit coated at 820° C. in certain slabs. It is believed that this is due to the increased degradation and susceptibility to chipping caused by the higher temperature process. The difference was too small to be accurately determined by these tests, however. A comparison of diamond retention between the uncoated grit and the triple coated grit of Example 16 showed that almost twice as much coated grit was retained.

Figure 2:
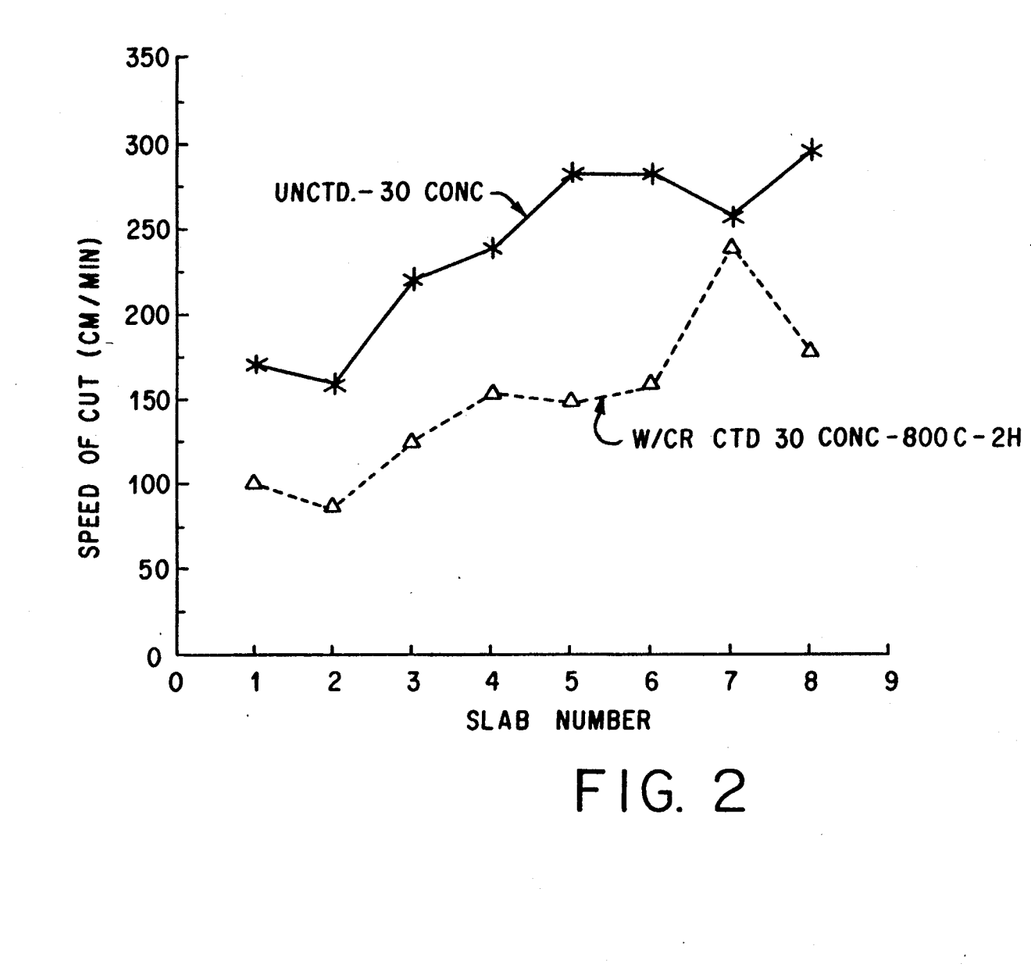
FIG. 2 compares the speed of cut of coated and uncoated grit in different samples of concrete.

The speed of cut of the saw segments prepared with grit as in Examples 16 and 17 were also compared to that of the uncoated grit. Uncoated diamond slowed significantly higher speed of cut than the grit coated with chromium at 800° C., as shown in FIG. 2. It is believed that this is due to the increased susceptibility to crushing by the coated grits from the degradation caused by the coating procedures. The speed of cut is related to the force per cutting point of the tool. The cutting tool applies a constant cutting force distributed over the cutting points, the exposed grit, in the tool. Crushed diamonds have a larger surface area than uncrushed diamonds, therefore a constant cutting force is applied over a larger surface area, decreasing the cutting force of each diamond. Furthermore, crushed diamonds have decreased exposure above the matrix, which interferes with their ability to cut through the concrete. This combines to lower the speed of cut of the saw segment.

In general, decreasing the diamond concentration can increase the cutting speed of the tool by increasing the force per cutting edge. This also increases the wear of the grit, however. The results of the wear tests above suggested that when using coated grits, the diamond concentration could be decreased to improve the speed of cut, without increasing the wear of the segment, when compared to segments utilizing uncoated grit.

Figure 3:
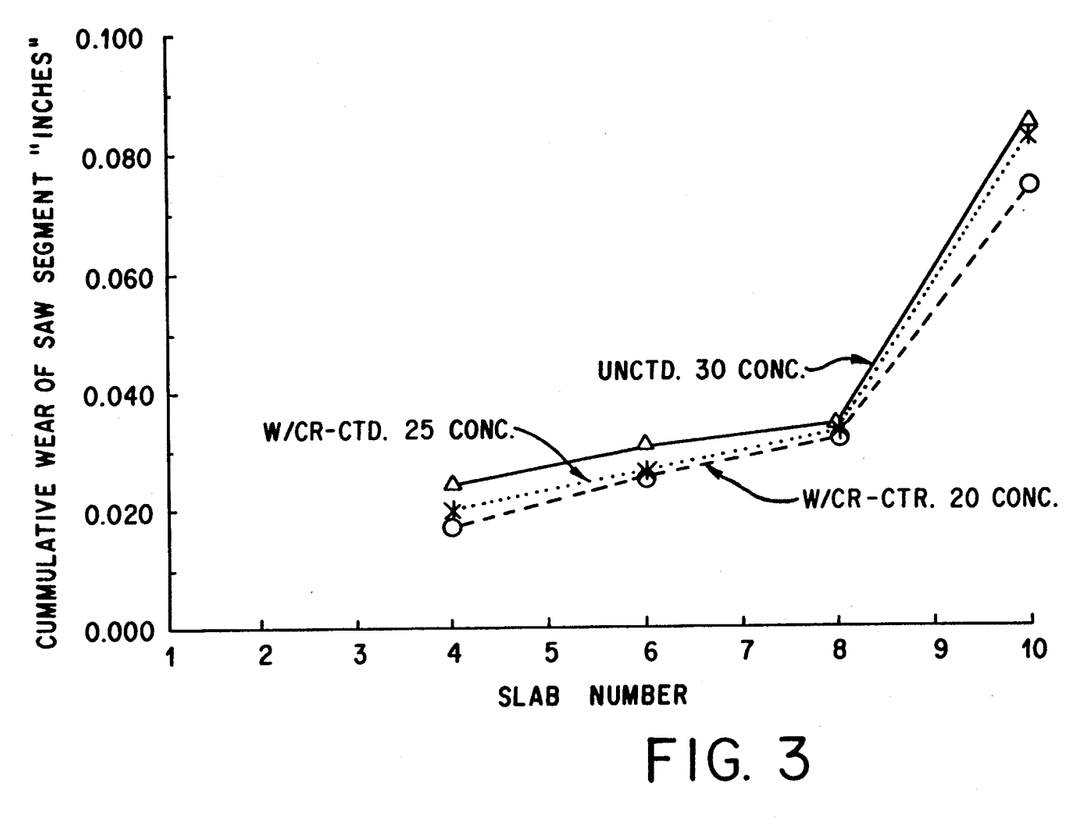
FIG. 3 compares the wear of uncoated and coated grit at different diamond concentrations.
Figure 4:
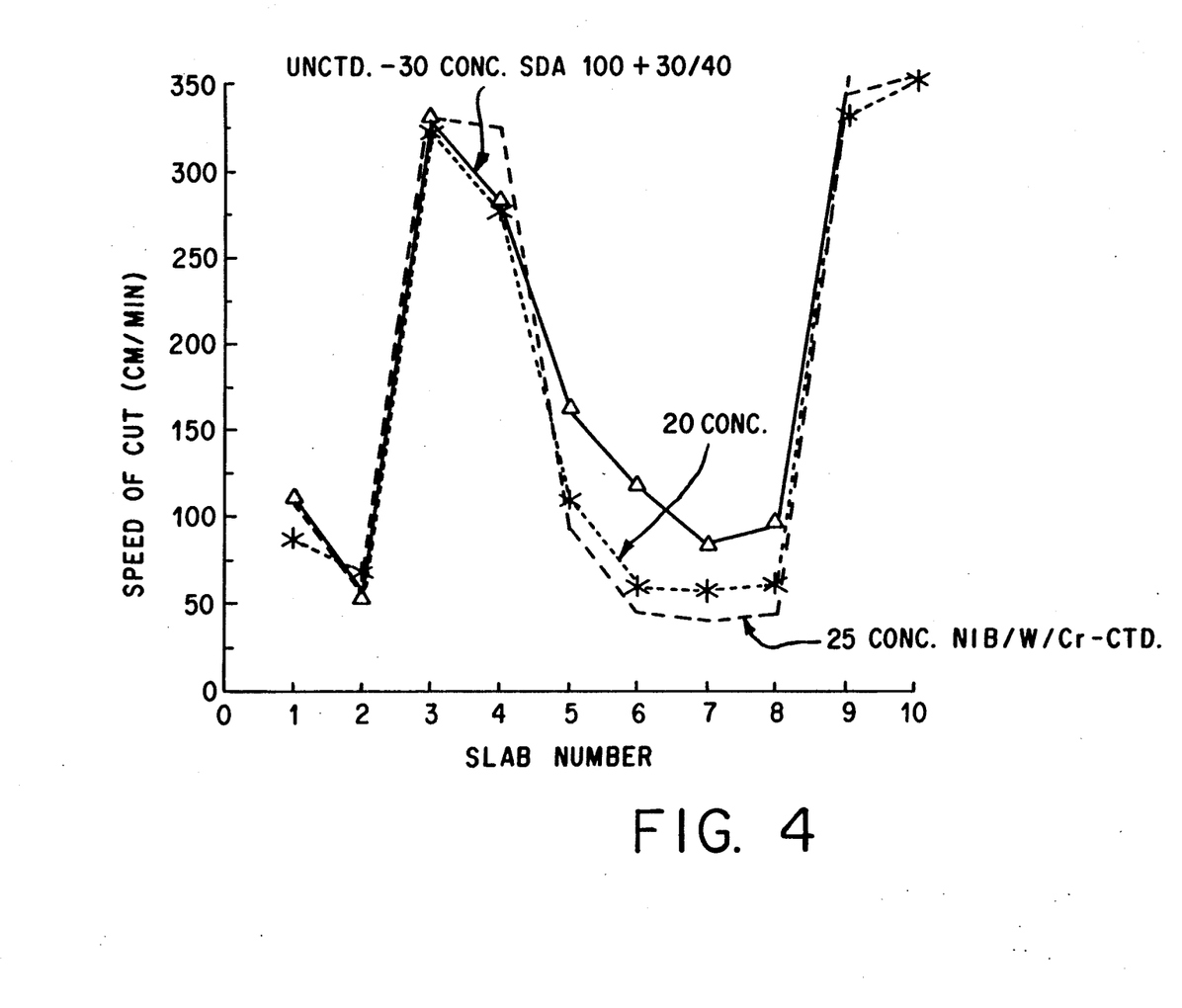
FIG. 4 compares the speed of cut of uncoated and coated grit at different diamond concentrations.

Saw segments prepared with 20 and 25 concentration (5% and 6.25% by volume diamond, respectively) diamond grit coated by the processes described in Example 17 were tested for wear and speed of cut. Comparison with the test results of the saw segments of uncoated grit of 30 concentration (7.5%), demonstrated that the coated grit of 20 and 25 concentration had somewhat less wear, as shown in FIG. 3. The 25 concentration coated grit wear was slightly less than that of the 20 concentration saw segments. In addition, FIG. 4 shows that the speed of cut was comparable for each saw segment concentration in slabs 1–4 and 9–10. The speed of cut of the uncoated, 30 concentration diamond grit was much faster in slabs 5–8, however. These results suggest that slabs 5–8 were "hard" concrete, while slabs 1–4 and 9–10 were either "soft" or "semi-hard" concrete. Therefore, a lower concentration of diamond grit can be used in abrasive cutting tool matrices in certain applications, when the grit are prepared in accordance with the present invention. This results in significant cost savings, as well as an improvement in performance.

It is believed that the lower speed of cut by the coated grit in the hard concrete of slabs 5–8 was due to increased chipping and crushing of the diamond weakened by degradation during the coating process, by the harder concrete. As described above, this decreases the speed of cut. Therefore, despite the stronger bond between the grit and the matrix, diamond degradation decreased the overall performance of the coated grit. Based on the Friability tests discussed above, if the grit were coated at 720° C., they would suffer little or no degradation. Therefore, there might not have been as much chipping or crushing by the hard concrete and the speed of cut could have been closer to that of the uncoated grit.

Alternatively, higher grade diamond, such as SDA 100s or MSD, which should withstand the temperatures of the coating process without significant degradation, could be used. Preliminary results with SDA 100s grit coated in accordance with the present invention have shown improvement in wear and speed of cut in hard concrete. The higher cost of this grade of diamond would be offset by the use of lower diamond concentration in the tool matrix.

What is claimed is:

1. Coated diamond grit comprising:
   a diamond particles;
   a first coating layer consisting essentially of chromium carbide chemically bonded to said diamond particles; and
   a second coating layer comprising an oxidation resistant carbide forming metal having a carbided inner portion thereof chemically bonded directly to said first coating layer.

2. Coated diamond grit as in claim 1, wherein said metal of said second coating layer is chosen from the group consisting of tungsten, tantalum or molybdenum.

3. Coated diamond grit as in claims 1 or 2, wherein said second coating layer includes an outer portion which comprises the oxidation resistant metal.

4. Coated diamond grit as in claim 1, wherein said first coating layer is between 0.05–5 microns in thickness.

5. Coated diamond grit as in claim 2, wherein said first coating layer is approximately 0.05–0.40 microns in thickness.

6. Coated diamond grit as in claim 3, wherein said second coating layer is between about 1–30 microns in thickness.

7. Coated diamond grit as in claim 4, wherein the thickness of said second coating layer is between about 5-15 microns.

8. Coated diamond grit as in claims 1 or 2, further comprising a third coating layer including a metal chosen from the group consisting of nickel, cobalt or iron, or alloys thereof.

9. Coated diamond grit as in claims 1 or 2, wherein said diamond particles have a nominal diameter of at least about 40 microns.

10. Coated diamond grit as in claims 1 or 2, wherein said diamond particles have a nominal diameter of at least 200 microns.

11. A method of manufacturing coated diamond grits comprising forming a continuous first coating layer on each of said grits said first coating layer consisting essentially of chromium carbide; and then applying a second coating layer comprising an oxidation resistant carbide forming metal.

12. The method of claim 11, further including the step of outgassing said grits by heating prior to the first coating step.

13. The method of claim 11, wherein said second application step comprises applying a metal chosen from the group consisting of tungsten or tantalum by chemical vapor deposition or physical vapor deposition.

14. The method of claim 13, further comprising heat treating said coated grit after said second application step at temperature sufficient for the inner portion of said second layer metal to carbide with said first metal coating layer.

15. The method of claim 14, wherein said heat treatment is conducted at a temperature of between about 720° 1 C. and a temperature less than the temperature of the first application step, for between about 1 minute-1 hour.

16. The method of claim 11 or 13, further comprising applying a third metal layer over said second layer, said third metal layer being chosen from the group consisting of nickel, iron or cobalt, or alloys thereof, by electrolytic or electroless deposition.

17. Triple metal coated diamond grit comprising; diamond particles; a first coating chemically bonded to each of said diamond particles consisting essentially of chromium carbide, a second coating comprising tungsten or tantalum carbide, chemically bonded directly to said first coating, and a third metal coating comprising nickel adjacent and bonded to said second layer, said second metal coating including an outer portion respectively of tungsten or tantalum.

18. A method of manufacturing multilayered metal coated diamond grit comprising;
forming an inner chromium carbide layer to said grit by applying a layer of chromium thereto by metal vapor deposition;
applying a layer of tungsten or tantalum over said chromium carbide by chemical vapor phase deposition; and
heat treating said coated grit to carbide the inner portion of said tungsten or tantalum layer.

19. The method of claim 18, further comprising applying a third metal layer of nickel or a nickel base alloy by electrolytic or electroless plating.

20. A superabrasive cutting elements comprising a matrix and multilayer metal coated diamond grits bonded to said matrix; said multilayer metal coated grits comprising a first layer consisting essentially of chromium carbide chemically bonded directly to said grits and a second layer comprising an oxidation resistant carbide forming metal having an inner carbide portion chemically bonded to said first layer.

21. The superabrasive cutting element as in claim 20, wherein said multilayer metal coated grit further comprises a third layer of metal chosen from the group consisting of nickel, cobalt or iron, or alloys thereof coated over said second layer.

22. The superabrasive cutting element as in claim 21, wherein said matrix is a resin.

23. The superabrasive cutting element as in claim 22 wherein said resin is chosen from the group consisting of phenol formaldehyde, thermoplastic polyimide, epoxies or polyurethanes.

24. The superabrasive cutting element as in claim 20, wherein said matrix comprises a metal chosen from the group consisting of nickel, cobalt, copper or tin, or alloys thereof, said multilayer metal coated grit being chemically bonded to said matrix.

25. The superabrasive cutting element as in claims 20, 22 or 24, further including a support to which said matrix is attached.

26. The superabrasive cutting element as in claim 20 wherein said oxidation resistant carbide forming metal is chosen from the group consisting of tungsten or tantalum.

27. Multilayer metal superabrasive grit comprising cubic boron nitride having a first coating layer chemically bonded to said grit, said coating layer consisting essentially of either or both of a metal nitride or a metal boride; and a second coating layer comprising an oxidation resistant nitride or boride forming metal chemically bonded to said first coating layer by a respective nitride or boride inner portion of said second coating layer, the outer portion thereof comprising said oxidation resistant metal.

28. Multilayer metal coated superabrasive grit as in claim 27, wherein the metal of said first layer is chosen from the group consisting of titanium or zirconium.

29. Multilayer metal coated superabrasive grit as in claim 27 or 28, wherein said oxidation resistant metal comprises tantalum.

30. A cutting tool element including multilayer metal coated superabrasive grit as in claim 29, and a matrix bonded to said grit.

31. A cutting tool element as in claim 30, wherein said matrix is chosen from the group consisting of a metal, an alloy or a resin.

32. A cutting tool comprising a cutting tool element as in claim 30, and a support, said cutting tool element being bonded to said support.

* * * * *

UNITED STATES PATENT AND TRADEMARK OFFICE
CERTIFICATE OF CORRECTION

PATENT NO. : 5,024,680

DATED : June 18, 1991

INVENTOR(S) : Sy-Hwa Chen and Chien-Min Sung

It is certified that error appears in the above-identified patent and that said Letters Patent is hereby corrected as shown below:

Claim 15, Column 15, line 37, delete the letter "1" after "720°" and before "C".

Claim 20, Column 16, line 6, delete the word "elements" and insert the word -- element--.

Claim 28, Column 16, line 48, add the word "coating" between the words "first" and "layer".

Signed and Sealed this

Twenty-third Day of February, 1993

Attest:

STEPHEN G. KUNIN

Attesting Officer

Acting Commissioner of Patents and Trademarks